United States Patent [19]
Toyama

[11] Patent Number: 4,953,047
[45] Date of Patent: Aug. 28, 1990

[54] MAGNETIC HEAD SANDWICH ASSEMBLY HAVING REDUCED THICKNESS

[75] Inventor: Akiyoshi Toyama, Nagano, Japan

[73] Assignee: Kabushiki Kaisha Sankyo Seiki Seisakusho, Nagano, Japan

[21] Appl. No.: 915,926

[22] Filed: Oct. 6, 1986

Related U.S. Application Data

[63] Continuation of Ser. No. 564,274, Dec. 22, 1983, abandoned.

[30] Foreign Application Priority Data

Dec. 23, 1982 [JP] Japan .................................. 57-225018

[51] Int. Cl.$^5$ ............................................. G11B 5/127
[52] U.S. Cl. .................................... 360/110; 360/125
[58] Field of Search .................... 360/2, 110, 123, 125, 360/127, 129; 29/603

[56] References Cited

U.S. PATENT DOCUMENTS

| | | | |
|---|---|---|---|
| 2,943,384 | 7/1960 | Wisner | 360/110 |
| 3,611,557 | 4/1969 | Hardardt et al. | 360/129 |
| 3,855,629 | 12/1974 | Koorneef et al. | 360/125 |
| 4,058,846 | 11/1977 | Knutson et al. | 360/118 |

Primary Examiner—David J. Severin
Attorney, Agent, or Firm—Sughrue, Mion, Zinn, Macpeak and Seas

[57] ABSTRACT

A thin magnetic head having a structure which makes it possible to significantly reduce the thickness of the head. First and second nonmagnetic metal plates 2 are fixedly attached to respective opposite sides of two core blocks 1. The intermediate metal plates and core blocks are sandwiched between and fixedly soldered to connecting metal plates 6, to thereby integrate the two core blocks with one another.

4 Claims, 1 Drawing Sheet

MAGNETIC HEAD SANDWICH ASSEMBLY HAVING REDUCED THICKNESS

This is a continuation of application Ser. No. 564,274, filed Dec. 22, 1983, now abandoned.

BACKGROUND OF THE INVENTION

The present invention relates to a magnetic head having a structure which makes it possible to significantly reduce the thickness of the head compared with prior art magnetic heads.

One technique for reducing the thickness of a magnetic head is disclosed in Japanese Patent Application No. 96237/1981, filed by the present applicant. In this technique, two core blocks, each carrying a winding, are disposed in contact with one another. The core blocks are coupled with metal plates. Soldering and spot welding can be used to attach the core blocks and metal plates. However, there is a disadvantage that it may not always be possible to form a good soldering or spot welding connection, and even if some such connection is made, its strength may not be sufficient. In the case where a Sendust alloy is used as the material for the core blocks, an adhesive agent can be used to attach the metal plates and cores. As the adhesive agent, generally a high temperature thermosetting epoxy resin has been used. The core blocks and the metal plates can be fixed with a sufficient adhesive strength by hardening the epoxy resin at 200° C. for about five hours. In this method, however, there is a disadvantage that, since the softening point of the urethane covering for the wire wound on the core blocks is 270° C., deterioration may occur in the urethane covering upon heating to 200° C. for five hours, thus lowering the insulating properties of the urethane.

SUMMARY OF THE INVENTION

An object of the present invention is therefore to eliminate the above-mentioned disadvantages of the prior art and to provide a magnetic head which has a simple structure and reduced thickness.

Another object of the invention is to provide a thin magnetic head of used as a multi-channel magnetic head for a card reading system.

In satisfaction of the above and other objects, in accordance with the invention, two core blocks, each having intermediate nonmagnetic metal plates attached on opposite sides, are disposed in contact with one another. Connecting plates dimensioned to cover the two core blocks are fixed to the intermediate metal plates by soldering, to thereby integrate the core blocks with each other.

BRIEF DESCRIPTION OF THE DRAWINGS

FIGS. 1 to 4 are perspective views showing various steps used to produce a magnetic head according to the present invention of which:

FIG. 1 is an exploded perspective view of a core block and intermediate metal plates;

FIG. 2 is a perspective view showing the core blocks and intermediate plates assembled together;

FIG. 3 is a perspective view showing a core block with a winding thereon; and

FIG. 4 is an exploded perspective view of the two core blocks and connecting metal plates.

DESCRIPTION OF THE PREFERRED EMBODIMENTS

Figure 1:
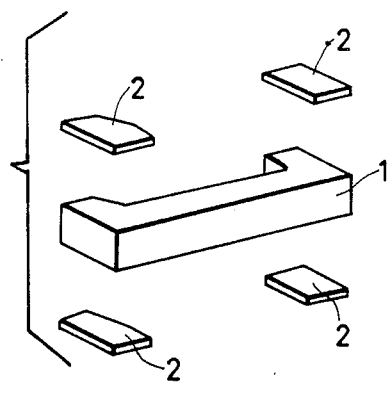
Figure 2:
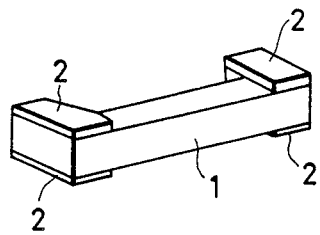

In FIG. 1, reference numeral 1 designates a core block having a substantially C-shaped external form, and 2 designates an intermediate metal plate. Four intermediate metal plates 2 are provided for each of the two core blocks 1. As the material for these intermediate metal plates 2, phosphor bronze or brass, which are nonmagnetic and solderable, can be used. The four intermediate metal plates 2 are fixed to the opposite sides of each of the core blocks adjacent to the ends of the core blocks 1. The intermediate metal plates 2 may be made to adhere to the core blocks 1 by the use of a high temperature thermosetting epoxy resin. The epoxy resin is hardened at 200° C. for about five hours so that the intermediate metal plates 2 are fixed to each of the core blocks 1 with a sufficient bonding strength.

The reason why the intermediate metal plates 2 are disposed only at the ends of the core block 1 is that the intermediate metal plates 2 provide space for accommodating a winding 3 when the winding 3 is applied to the core block, thereby contributing to the reduction of the overall thickness of the head.

Figure 3:
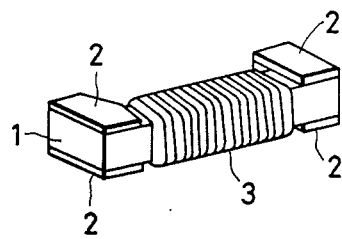
Figure 4:
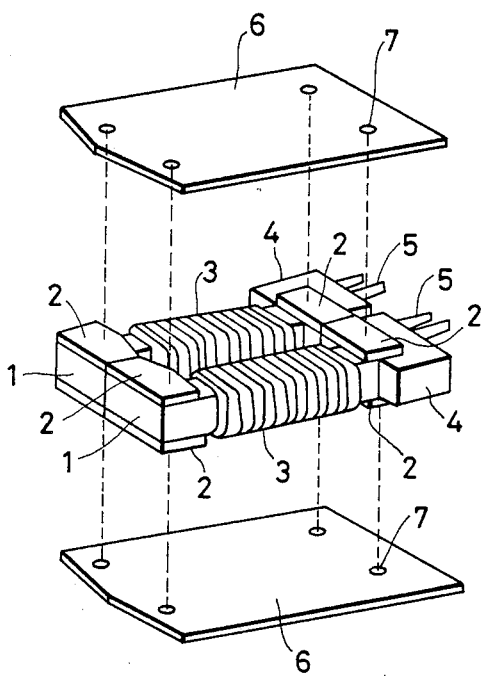

The winding 3 is wound upon an insulating tape, as shown in FIG. 3, around the core block 1 to which the intermediate metal plates have been bonded. The two core blocks are then coupled together with the respective side faces thereof forming a gap at one end. After each of the core blocks 1 has been wound with the winding 3, it is provided with a terminal plate 4 and terminals 5. The assembly is then sandwiched by a pair of nonmagnetic, solderable connecting metal plates 6. The coupled core blocks 1 are fixedly integrated with each other by soldering the intermediate metal plates 2, fixed to the respective core blocks 1, with the connecting metal plates 6 through soldering holes 7 formed in the respective connecting metal plates 6, thereby completing the basic construction of the magnetic head. The connecting metal plates 6 not only serve as connecting members, but also act as shielding plates.

If a nonmagnetic, electrically conductive material is used for the intermediate metal plates 2, as well as the connecting metal plates 6, and if each of the intermediate metal plates 2 and the core block 1 are coated therebetween with an electrically conductive paint, it becomes possible to obtain a ground connection directly at the connecting metal plate 6. If a ground wire is attached when the connecting metal plates 6 are soldered to the intermediate metal plates 2, the manufacturing operation becomes further simplified.

Furthermore, in the case where the thus assembled magnetic head is applied to a multichannel magnetic card reader, a supporting portion may be integrally formed with the connecting metal plates 6 so that the connecting metal plates 6 can also serve as magnetic head supporting members for attaching the magnetic head to the magnetic card reader frame. The overall magnetic head supporting mechanism can be greatly simplified.

As described above, according to the present invention, two core blocks each having nonmagnetic intermediate metal plates fixed thereto on opposite sides are placed in contact with one another. Connecting metal plates disposed covering the two core blocks are fixedly soldered together to integrate the two core blocks. Accordingly, the two core blocks can be fixed to each other by soldering in a short time, and therefore it is not necessary to heat the core blocks with windings thereon at a high temperature for a relatively long period of time, thereby preventing deterioration from occurring in the urethane insulating material of the wire of the windings of the core blocks. Further, even in the case where a material for the core blocks such as a Sendust alloy is used, which cannot be provided with a sufficient bonding strength by direct soldering or spot welding, the intermediate metal plates can still easily be bonded to the core blocks and the two core blocks integrally fixed by soldering. In such a case, the time, for example, for pouring resin or the like can be saved, and a thin magnetic head having a simple arrangement is provided.

I claim:

1. A dimensionally compact magnetic head assembly of reduced thickness, comprising:
   (a) a pair of C-shaped magnetic cores (1) each having a central body portion and outwardly extending arms at opposite ends thereof to define C-shaped upper and lower planar surfaces, said cores being of equal thickness and being disposed facing each other with outer ends of two of said arms lying in close and direct proximity to one another to define a single gap therebetween,
   (b) four pairs of intermediate, planar, non-magnetic, solderable metal plates (2) of equal thickness individually thermally bonded to opposite upper and lower surfaces of each of said core arms,
   (c) a pair of insulated wire coils (3) individually wound around the central body portions of the cores intermediate the arms and bonded metal plates, and
   (d) a pair of planar, non-magnetic, solderable metal connecting plates (6) of equal thickness and configuration respectively overlying and underlying the facingly disposed cores and intermediate plates and soldered to said intermediate plates to define therewith a compact and tightly sandwiched construction of reduced thickness, the intermediate plates being thermally bonded to the core arms prior to the winding of the coils to avoid any thermal deterioration of the coil wire insulation, and wherein the intermediate plates are at least as thick as the coils to provide sufficient coil winding space and to enable the overlaying and underlying of the planar connecting plates.

2. A magnetic head assembly as defined in claim 1, wherein the cores have symmetrical configurations.

3. A magnetic head assembly as defined in claim 1, wherein the intermediate plates and connecting plates are electrically conductive to thereby implement the grounding of the assembly.

4. A magnetic head assembly as defined in claim 3, wherein the cores have symmetrical configurations.

* * * * *